US011379388B1

(12) United States Patent
Balakrishnan et al.

(10) Patent No.: US 11,379,388 B1
(45) Date of Patent: Jul. 5, 2022

(54) CREDIT SCHEME FOR MULTI-QUEUE MEMORY CONTROLLERS

(71) Applicant: Advanced Micro Devices, Inc., Santa Clara, CA (US)

(72) Inventors: Kedarnath Balakrishnan, Bangalore (IN); Shriram Ravichandran, Bangalore (IN)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/218,650

(22) Filed: Mar. 31, 2021

(51) Int. Cl.
*G06F 13/16* (2006.01)

(52) U.S. Cl.
CPC ...... *G06F 13/1642* (2013.01); *G06F 13/1668* (2013.01)

(58) Field of Classification Search
None
See application file for complete search history.

(56) References Cited

U.S. PATENT DOCUMENTS

| | | | |
|---|---|---|---|
| 8,255,618 B1 * | 8/2012 | Borchers | G06F 13/1642 710/24 |
| 10,037,150 B2 | 7/2018 | Magro et al. | |
| 10,303,384 B1 * | 5/2019 | Agarwal | G06F 3/0604 |
| 11,137,941 B2 * | 10/2021 | Wang | G06F 3/061 |
| 2012/0069034 A1 * | 3/2012 | Biswas | G06F 9/5033 711/170 |
| 2012/0072677 A1 * | 3/2012 | Biswas | G06F 13/18 711/149 |
| 2021/0019085 A1 * | 1/2021 | Zhu | G06F 3/0659 |

\* cited by examiner

*Primary Examiner* — Michael Sun
(74) *Attorney, Agent, or Firm* — Polansky & Associates, P.L.L.C.; Paul J. Polansky; Nathan H. Calvert

(57) ABSTRACT

A memory controller includes an address decoder, a first command queue coupled to a first output of the address decoder for receiving memory access requests for a first memory channel, and the second command queue coupled to a second output of the address decoder for receiving memory access requests for a second memory channel. A request credit control circuit is coupled to the first command queue and the second command queue, and operates to track a number of outstanding request credits. The request credit control circuit issues a request credit in response to a designated event based on a number of available entries of the first and second command queues.

28 Claims, 5 Drawing Sheets

US 11,379,388 B1

CREDIT SCHEME FOR MULTI-QUEUE MEMORY CONTROLLERS

BACKGROUND

Computer systems typically use inexpensive and high density dynamic random access memory (DRAM) chips for main memory. Most DRAM chips sold today are compatible with various double data rate (DDR) DRAM standards promulgated by the Joint Electron Devices Engineering Council (JEDEC). DDR DRAMs use conventional DRAM memory cell arrays with high-speed access circuits to achieve high transfer rates and to improve the utilization of the memory bus. A DDR memory controller may interface with multiple DDR channels in order to accommodate more DRAM modules, and to exchange data with the memory faster than using a single channel. For example, some memory controllers include two or four DDR memory channels.

Modern DDR memory controllers maintain queues to store pending memory access requests to allow them to pick the pending memory access requests out of order in relation to the order in which they were generated or stored to increase efficiency. To prevent memory access requests being denied because a particular queue is full, the data interface of a memory controller controls the flow of memory access requests using a credit control scheme in which request credits are provided to various parts of the host system such as its data interface fabric allowing them to send memory requests for entry into a command queue. Memory controllers also need to be flexible enough so they can be configured for different memory types, densities, and memory channel topologies, but to do so without requiring a large amount of additional circuit area that would add to chip cost to support these different modes.

Figure 1:
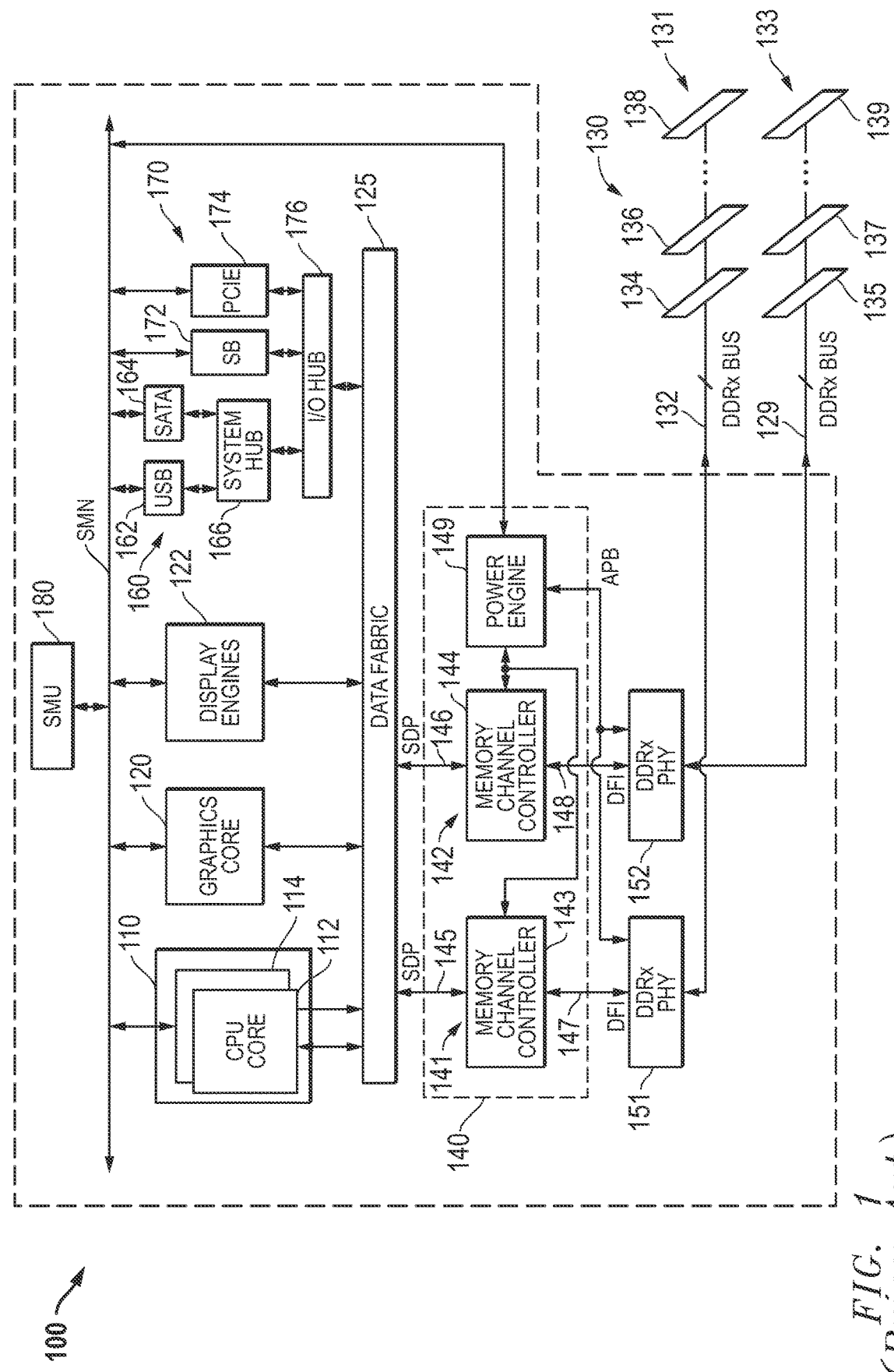
FIG. 1 illustrates in block diagram form an accelerated processing unit (APU) and memory system known in the prior art.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EMBODIMENTS

A memory controller includes an address decoder, a first command queue, a second command queue, and a request credit control circuit. The address decoder has a first input for receiving memory access requests, a first output, and a second output. The first command queue has an input connected to the first output of the address decoder for receiving memory access requests for a first memory channel, and a number of entries for holding memory access requests. The second command queue has an input connected to the second output of the address decoder for receiving memory access requests for a second memory channel, and a number of entries for holding memory access requests. The request credit control circuit is connected to the first command queue, and the second command queue. The request credit control circuit is operable to track a number of outstanding request credits, and to issue a request credit based on a number of available entries of the first and second command queues.

A method includes receiving a plurality of memory access requests at a memory controller. The addresses of the memory access requests are decoded, and one of a first memory channel and a second memory channel are selected to receive each of the memory access requests. After decoding the addresses, the method includes sending each memory access request to one of a first command queue associated with the first memory channel and a second command queue associated with the second memory channel. Responsive to a designated event, the method includes issuing a request credit based on a number of available entries of the first and second command queues.

A data processing system includes a data fabric, first and second memory channels, and a memory controller connected to the data fabric and the first and second memory channels for fulfilling memory access requests received over the data fabric from at least one memory accessing engine. The memory controller includes an address decoder, a first command queue, a second command queue, and a request credit control circuit. The address decoder has a first input for receiving memory access requests, a first output, and a second output. The first command queue has an input connected to the first output of the address decoder for receiving memory access requests for a first memory channel, and a number of entries for holding memory access requests. The second command queue has an input connected to the second output of the address decoder for receiving memory access requests for a second memory channel, and a number of entries for holding memory access requests. The request credit control circuit is connected to the first command queue, and the second command queue. The request credit control circuit is operable to track a number of outstanding request credits, and to issue a request credit based on a number of available entries of the first and second command queues.

FIG. 1 illustrates in block diagram form an accelerated processing unit (APU) 100 and memory system 130 known in the prior art. APU 100 is an integrated circuit suitable for use as a processor in a host data processing system, and includes generally a central processing unit (CPU) core complex 110, a graphics core 120, a set of display engines 122, a data fabric 125, a memory management hub 140, a set of peripheral controllers 160, a set of peripheral bus controllers 170, and a system management unit (SMU) 180.

CPU core complex 110 includes a CPU core 112 and a CPU core 114. In this example, CPU core complex 110 includes two CPU cores, but in other embodiments CPU core complex 110 can include an arbitrary number of CPU cores. Each of CPU cores 112 and 114 is bidirectionally connected to a system management network (SMN), which forms a control fabric, and to data fabric 125, and is capable of providing memory access requests to data fabric 125.

Each of CPU cores 112 and 114 may be unitary cores, or may further be a core complex with two or more unitary cores sharing certain resources such as caches.

Graphics core 120 is a high performance graphics processing unit (GPU) capable of performing graphics operations such as vertex processing, fragment processing, shading, texture blending, and the like in a highly integrated and parallel fashion. Graphics core 120 is bidirectionally connected to the SMN and to data fabric 125, and is capable of providing memory access requests to data fabric 125. In this regard, APU 100 may either support a unified memory architecture in which CPU core complex 110 and graphics core 120 share the same memory space, or a memory architecture in which CPU core complex 110 and graphics core 120 share a portion of the memory space, while graphics core 120 also uses a private graphics memory not accessible by CPU core complex 110.

Display engines 122 render and rasterize objects generated by graphics core 120 for display on a monitor. Graphics core 120 and display engines 122 are bidirectionally connected to a common memory management hub 140 through data fabric 125 for uniform translation into appropriate addresses in memory system 130.

Data fabric 125 includes a crossbar switch for routing memory access requests and memory responses between any memory accessing agent and memory management hub 140. It also includes a system memory map, defined by basic input/output system (BIOS), for determining destinations of memory accesses based on the system configuration, as well as buffers for each virtual connection.

Peripheral controllers 160 include a universal serial bus (USB) controller 162 and a Serial Advanced Technology Attachment (SATA) interface controller 164, each of which is bidirectionally connected to a system hub 166 and to the SMN bus. These two controllers are merely exemplary of peripheral controllers that may be used in APU 100.

Peripheral bus controllers 170 include a system controller or "Southbridge" (SB) 172 and a Peripheral Component Interconnect Express (PCIe) controller 174, each of which is bidirectionally connected to an input/output (I/O) hub 176 and to the SMN bus. I/O hub 176 is also bidirectionally connected to system hub 166 and to data fabric 125. Thus for example a CPU core can program registers in USB controller 162, SATA interface controller 164, SB 172, or PCIe controller 174 through accesses that data fabric 125 routes through I/O hub 176. Software and firmware for APU 100 are stored in a system data drive or system BIOS memory (not shown) which can be any of a variety of non-volatile memory types, such as read-only memory (ROM), flash electrically erasable programmable ROM (EEPROM), and the like. Typically, the BIOS memory is accessed through the PCIe bus, and the system data drive through the SATA interface.

SMU 180 is a local controller that controls the operation of the resources on APU 100 and synchronizes communication among them. SMU 180 manages power-up sequencing of the various processors on APU 100 and controls multiple off-chip devices via reset, enable and other signals. SMU 180 includes one or more clock sources (not shown), such as a phase locked loop (PLL), to provide clock signals for each of the components of APU 100. SMU 180 also manages power for the various processors and other functional blocks, and may receive measured power consumption values from CPU cores 112 and 114 and graphics core 120 to determine appropriate power states.

Memory management hub 140 and its associated physical interfaces (PHYs) 151 and 152 are integrated with APU 100 in this embodiment. Memory management hub 140 includes memory channels 141 and 142 and a power engine 149. Memory channel 141 includes a host interface 145, a memory channel controller 143, and a physical interface 147. Host interface 145 bidirectionally connects memory channel controller 143 to data fabric 125 over a serial presence detect link (SDP). Physical interface 147 bidirectionally connects memory channel controller 143 to PHY 151, and conforms to the DDR PHY Interface (DFI) Specification. Memory channel 142 includes a host interface 146, a memory channel controller 144, and a physical interface 148. Host interface 146 bidirectionally connects memory channel controller 144 to data fabric 125 over another SDP. Physical interface 148 bidirectionally connects memory channel controller 144 to PHY 152, and conforms to the DFI Specification. Power engine 149 is bidirectionally connected to SMU 180 over the SMN bus, to PHYs 151 and 152 over the APB, and is also bidirectionally connected to memory channel controllers 143 and 144. PHY 151 has a bidirectional connection to memory channel 131. PHY 152 has a bidirectional connection memory channel 133.

Memory management hub 140 is an instantiation of a memory controller having two memory channel controllers and uses a shared power engine 149 to control operation of both memory channel controller 143 and memory channel controller 144 in a manner that will be described further below. Each of memory channels 141 and 142 can connect to state-of-the-art DDR memories such as DDR version five (DDR5), DDR version four (DDR4), low power DDR4 (LPDDR4), graphics DDR version five (GDDR5), and high bandwidth memory (HBM), and can be adapted for future memory technologies. These memories provide high bus bandwidth and high speed operation. At the same time, they also provide low power modes to save power for battery-powered applications such as laptop computers, and also provide built-in thermal monitoring.

Memory system 130 includes a memory channel 131 and a memory channel 133. Memory channel 131 includes a set of dual inline memory modules (DIMMs) connected to a DDRx bus 132, including representative DIMMs 134, 136, and 138 that in this example correspond to separate ranks. Likewise, memory channel 133 includes a set of DIMMs connected to a DDRx bus 129, including representative DIMMs 135, 137, and 139.

APU 100 operates as the central processing unit (CPU) of a host data processing system and provides various buses and interfaces useful in modern computer systems. These interfaces include two double data rate (DDRx) memory channels, a PCIe root complex for connection to a PCIe link, a USB controller for connection to a USB network, and an interface to a SATA mass storage device.

APU 100 also implements various system monitoring and power saving functions. In particular one system monitoring function is thermal monitoring. For example, if APU 100 becomes hot, then SMU 180 can reduce the frequency and voltage of CPU cores 112 and 114 and/or graphics core 120. If APU 100 becomes too hot, then it can be shut down entirely. Thermal events can also be received from external sensors by SMU 180 via the SMN bus, and SMU 180 can reduce the clock frequency and/or power supply voltage in response.

Figure 2:
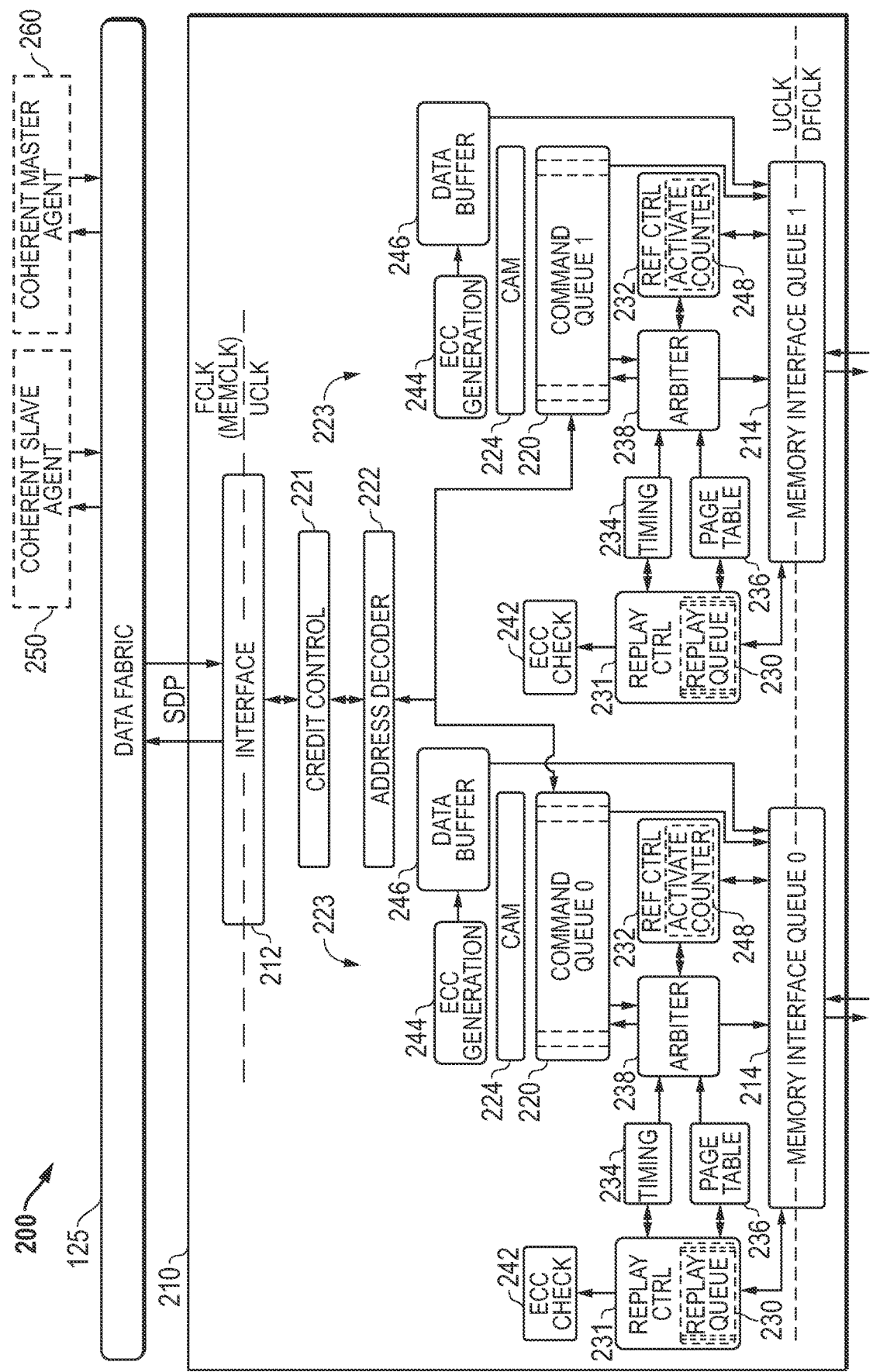
FIG. 2 illustrates in block diagram form a partial data processing system including a dual-channel memory controller that is suitable for use in an APU like that of FIG. 1 according to some embodiments.

FIG. 2 illustrates in block diagram form a partial data processing system 200 including a dual-channel memory controller 210 that is suitable for use in an APU like that of FIG. 1. Depicted is a dual-channel memory controller 210 connected to data fabric 125, to which it can communicate with a number of memory agents present in data processing system 200 including a coherent slave agent 250 and a coherent master agent 260. Dual-channel memory controller 210 is capable of replacing the two separate memory channel controllers 143 and 144 (FIG. 1) and controlling two DDRx channels together in a manner transparent to data fabric 125 and the various memory addressing agents in data processing system 200 such that a single memory controller interface 212 can be employed to send memory access commands and receive results. Also, dual channel memory controller 210 is capable of controlling two sub-channels as defined, for example, in the DDR5 specification for use with DDR5 DRAMS, or those sub-channels defined in the High Bandwidth Memory 2 (HBM2) and HBM3 standards. Dual-channel memory controller 210 generally includes interface 212, a credit control circuit 221, an address decoder 222, and two instances of memory channel control circuitry 223 each allocated to a different memory channel. Each instance of memory channel control circuitry 223 includes a memory interface queue 214, a command queue 220, a content addressable memory (CAM) 224, replay control logic 231 including a replay queue 230, a timing block 234, a page table 236, an arbiter 238, an error correction code (ECC) check circuit 242, an ECC generation block 244, a data buffer 246, and refresh control logic 232, including an activate counter 248. In other embodiments, only the command queues 230, arbiters 238, and memory interface queues 214 are duplicated for each memory channel or sub-channel used, with the remaining depicted circuitry being adapted for use with two channels. Further, while the depicted dual-channel memory controller includes two instances of an arbiter 238, command queue 220, and memory interface queue 214 for controlling two memory channels or sub-channels, other embodiments may include more instances, such as three or four or more, which are employed to communicate with DRAM on three or four channels or sub-channels according to the credit management techniques herein.

Interface 212 has a first bidirectional connection to data fabric 125 over a communication bus, and a second bidirectional connection to credit control circuit 221. In this embodiment, interface 212 employs scalable data port (SDP) links for establishing several channels to communicate with data fabric 125, but other interface link standards are also suitable for use. For example, in another embodiment the communication bus is compatible with the advanced extensible interface version four specified by ARM Holdings, PLC of Cambridge, England, known as "AXI4", but can be other types of interfaces in yet other embodiments. Interface 212 translates memory access requests from a first clock domain known as the "FCLK" (or "MEMCLK") domain to a second clock domain internal to dual-channel memory controller 210 known as the "UCLK" domain. Similarly, memory interface queue 214 provides memory accesses from the UCLK domain to a "DFICLK" domain associated with the DFI interface.

Credit control circuit 221 includes a bidirectional communication link to interface 212, which can be shared with address decoder 222 or can include dedicated SDP channels for managing request credits. Credit control circuit 221 also has inputs connected to both command queues 220, shown in the drawing as those shared with address decoder 222. Credit control circuit 221 generally controls request credits allocated to the data fabric for both memory channels. As further described below, the control process performed by credit control circuit 221 includes tracking a number of outstanding request credits, and issuing a request credit in response to a memory access request being de-allocated from one of the first and second command queues 220 if a number of outstanding request credits is lower than a smallest number of available entries of the first and second command queues 220, and if not, issuing no request credit responsive to the memory access request being de-allocated. Credit control circuit 221 also operates to issue a request credit without a corresponding de-allocation from the first or second command queue 220 if a memory access request is received that is allocated to one of the first and second command queues 220 with a highest number of available entries.

Address decoder 222 has a bidirectional link to credit control circuit 221, a first output connected to a first command queue 220 (labelled "Command Queue 0"), and a second output connected to a second command queue 220 (labelled "Command Queue 1"). Address decoder 222 decodes addresses of memory access requests received over data fabric 125 through interface 212. The memory access requests include access addresses in the physical address space represented in a normalized format. Based on the access addresses, address decoder 222 selects one of the memory channels, with an associated one of command queues 220, to handle the request. The channel selected is identified to credit control circuit 221 for each request so that credit issuance decisions may be made. Address decoder 222 converts the normalized addresses into a format that can be used to address the actual memory devices in memory system 130, as well as to efficiently schedule related accesses. This format includes a region identifier that associates the memory access request with a particular rank, a row address, a column address, a bank address, and a bank group. On startup, the system BIOS queries the memory devices in memory system 130 to determine their size and configuration, and programs a set of configuration registers associated with address decoder 222. Address decoder 222 uses the configuration stored in the configuration registers to translate the normalized addresses into the appropriate format. Each memory access request is loaded into the command queue 220 for the memory channel selected by address decoder 222.

Each command queue 220 is a queue of memory access requests received from the various memory accessing engines in APU 100, such as CPU cores 112 and 114 and graphics core 120. Each command queue 220 is bidirectionally connected to a respective arbiter 238 for selecting memory access requests from the command queue 220 to be issued over the associated memory channel. Each command queue 220 stores the address fields decoded by address decoder 222 as well other address information that allows the respective arbiter 238 to select memory accesses efficiently, including access type and quality of service (QoS) identifiers. Each CAM 224 includes information to enforce ordering rules, such as write after write (WAW) and read after write (RAW) ordering rules.

Arbiters 238 are each bidirectionally connected to a respective command queue 220 for selecting memory access requests to be fulfilled with appropriate commands. Arbiters 238 generally improve efficiency of its respective memory channel by intelligent scheduling of accesses to improve the usage of the memory bus of the memory channel. Each arbiter 238 uses a respective timing block 234 to enforce proper timing relationships by determining whether certain accesses in the respective command queue 220 are eligible for issuance based on DRAM timing parameters. For example, each DRAM has a minimum specified time between activate commands, known as "$t_{RC}$". Each timing block 234 maintains a set of counters that determine eligibility based on this and other timing parameters specified in the JEDEC specification, and is bidirectionally connected to replay queue 230. Each page table 236 maintains state information about active pages in each bank and rank of the respective memory channel for arbiter 238, and is bidirectionally connected to its respective replay queue 230. Arbiter 238 uses the decoded address information, timing eligibility information indicated by timing block 234, and active page information indicated by page table 236 to efficiently schedule memory accesses while observing other criteria such as quality of service (QoS) requirements. For example, arbiter 238 implements a preference for accesses to open pages to avoid the overhead of precharge and activation commands required to change memory pages, and hides overhead accesses to one bank by interleaving them with read and write accesses to another bank. In particular during normal operation, arbiter 238 normally keeps pages open in different banks until they are required to be precharged prior to selecting a different page. Arbiter 238, in some embodiments, determines eligibility for command selection based on at least on respective values of activate counter 248 for target memory regions of the respective commands.

Each error correction code (ECC) generation block 244 determine the ECC of write data to be sent to the memory. ECC check circuits 242 check the received ECC against the incoming ECC.

Each replay queues 230 is a temporary queue for storing selected memory accesses picked by arbiter 238 that are awaiting responses, such as address and command parity responses. Replay control logic 231 accesses ECC check circuit 242 to determine whether the returned ECC is correct or indicates an error. Replay control logic 231 initiates and controls a replay sequence in which accesses are replayed in the case of a parity or ECC error of one of these cycles. Replayed commands are placed in the memory interface queue 214.

Each instance of refresh control logic 232 includes state machines for various powerdown, refresh, and termination resistance (ZQ) calibration cycles that are generated separately from normal read and write memory access requests received from memory accessing agents. For example, if a memory rank is in precharge powerdown, it must be periodically awakened to run refresh cycles. Refresh control logic 232 generates refresh commands periodically and in response to designated conditions to prevent data errors caused by leaking of charge off storage capacitors of memory cells in DRAM chips. Each instance of refresh control logic 232 includes an activate counter 248, which in this embodiment has a counter for each memory region which counts a rolling number of activate commands sent over the memory channel to a memory region. The memory regions are memory banks in some embodiments, and memory sub-banks in other embodiments. In addition, refresh control logic 232 periodically calibrates ZQ to prevent mismatch in on-die termination resistance due to thermal changes in the system.

In response to write memory access requests received from interface 212, ECC generation blocks 244 compute an ECC according to the write data. Data buffers 246 store the write data and ECC for received memory access requests. Data buffers 246 output the combined write data/ECC to a respective memory interface queue 214 when a respective arbiter 238 picks the corresponding write access for dispatch to the memory channel.

For embodiments with more than two memory channels or sub-channels, additional command queues, arbiters, and memory interface queues are added in parallel to those depicted, using to a single address decoder 222 and credit control circuit 221. Such a design allows the credit control scheme discussed below to be employed with more than two channels or sub-channels, with corresponding efficiencies gained in using queue capacity and channel capacity. As discussed, the entire group of memory channel control circuitry 223 may also be reproduced for each channel or sub-channel, or the same logic blocks may be employed with additional capacity added to track the added command queues, arbiters, and memory interface queues.

Figure 3:
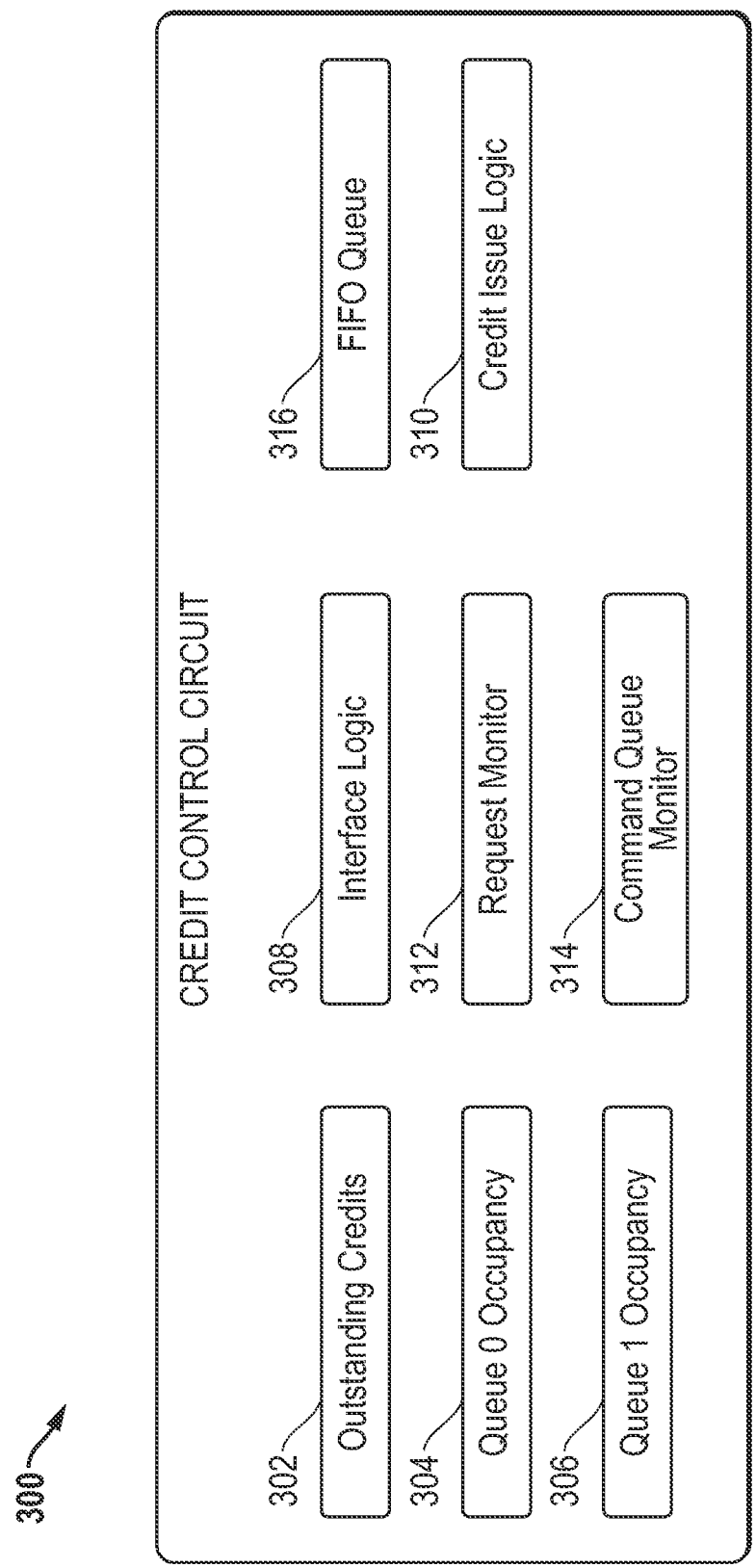
FIG. 3 illustrates a block diagram of a credit control circuit suitable for implementing credit control circuit of FIG. 2 according to some embodiments.

FIG. 3 illustrates a block diagram of a credit control circuit 300 suitable for implementing credit control circuit 221 of FIG. 2 according to some embodiments. Credit control circuit 300 includes outstanding credit tracking logic 302, queue 0 occupancy logic 304, queue 1 occupancy logic 306, interface logic 308, credit issue logic 310, a request monitor 312, a command queue monitor 314, and a first-in-first-out (FIFO) credit queue 316 ("FIFO queue 316"). Outstanding credit tracking logic 302 generally maintains a count of request credits that have been issued, issues new request credits, and tracks request credits that are redeemed when an associated memory access request is received at memory controller 210. The request credits are issued to one or more requesting agents on the data fabric, In this embodiment, a request credit is one of two types, initial credits and additional credits which are issued because of the higher capacity provided by the use of two command queues and two channels or sub-channels. The use of additional credits allows credit control circuit 300 to issue further credits over the number of initial credits under certain conditions order to more fully and efficiently utilize the capacity of both command queues. The additional credits are tracked by outstanding credit tracking logic in the same way as initial credits, and count toward the total outstanding credits.

Queue 0 occupancy logic 304 and queue 1 occupancy logic 306 maintain a count of the number of unallocated entries in the respective command queues. In some embodiments, the count is produced by subtracting the current number of occupied entries for each command queue from the command queue size. In other embodiments, unoccupied entries are tracked directly from the command queue, or indirectly based on tracking the entries that are loaded to each command queue and the entries that are deallocated from each command queue.

Request monitor 312 monitors incoming requests that are allocated by address decoder 222 to a respective command queue, including which queue receives each request. This information is used by credit issue logic 310 in determining when and whether a new request credit is issued. Command queue monitor 314 monitors both command queues to determine when requests are de-allocated from the command queue. FIFO queue 316 holds additional request credits that are issued when commands are de-allocated from each command queue under certain conditions, as described with respect to FIG. 5. These credits are released to the fabric as soon as credit issue logic 300 determines this is allowed, as further described below. Credit issue logic 310 employs the number of outstanding credits, the queue occupancy of each queue, and the monitored information from request monitor 312 and command queue monitor 314 to decide when to issue request credits, as further described below with respect to FIG. 4 and FIG. 5. In some versions, the credit control functionality is embodied in monitoring logic circuitry inside the memory controller's arbiter (such as arbiter 238, FIG. 2). In other versions, the process may be performed by digital logic or a controller having similar functionality while using different methods of arbitration than those employed in sub-arbiters 305 and final arbiter 350 described above.

Figure 4:
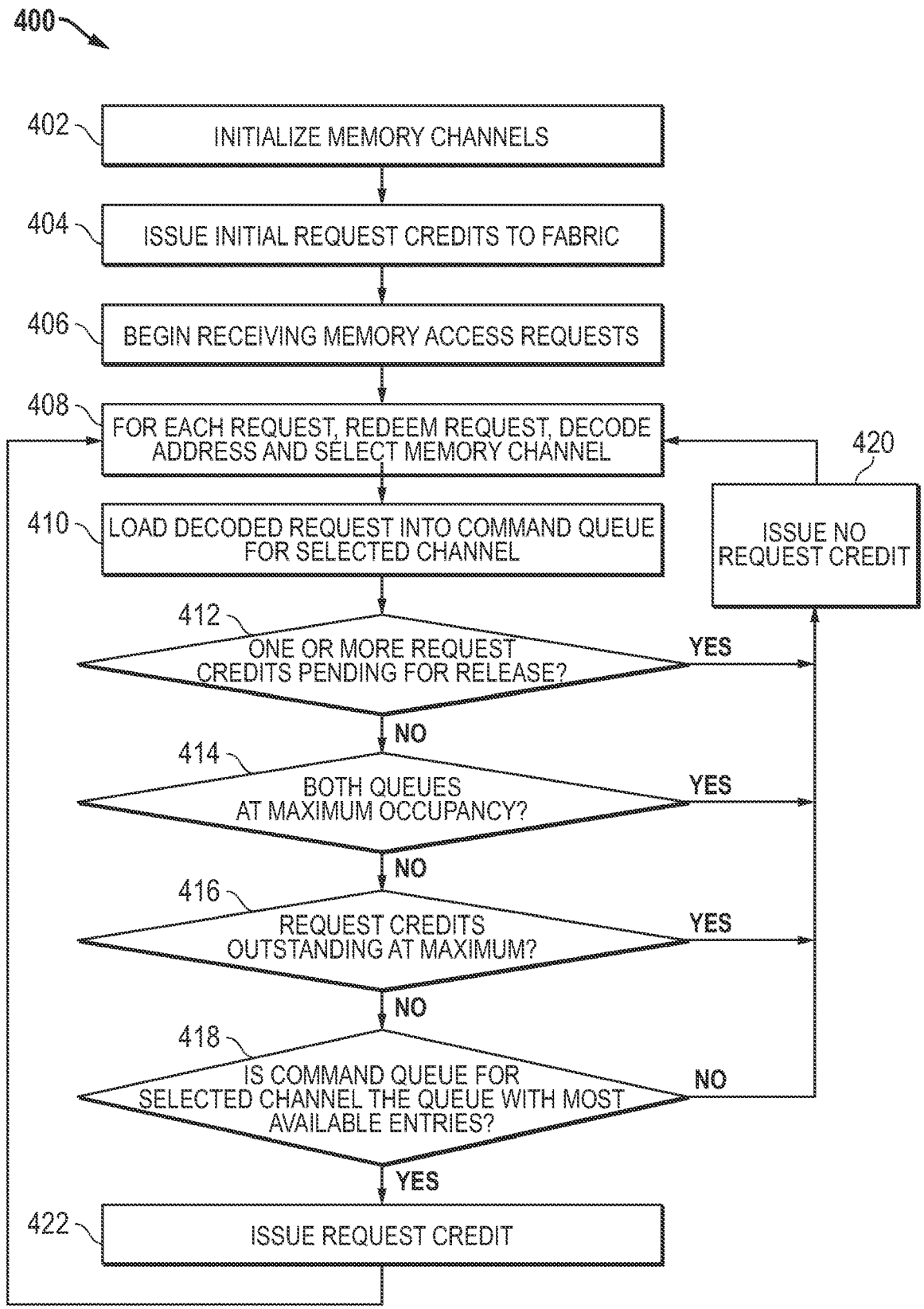
FIG. 4 is a flow diagram of a process for managing request credits according to some embodiments.

FIG. 4 is a flow diagram 400 of a process for managing request credits according to some embodiments. The depicted process is suitable for being performed by a credit control circuit such as credit control circuit 300 of FIG. 3 embodied in a dual-channel memory controller, a memory controller coupled to two or more memory channels or sub-channels, or another suitable digital control circuit which tracks outstanding request credits and monitors two or more command queues for a dual-channel memory controller. The process generally works to manage request credits for memory access requests for both memory channels associated with Command Queue 0 and Command Queue 1. The request credits are employed by the data fabric independently of which command queue and memory channel may ultimately be selected to receive the associated access requests. That is, the presence of two memory channels or sub-channels managed by the memory controller is transparent to the data fabric and the various memory agents which access the data fabric. For embodiments In response to the two memory channels being initialized at block 402, the process at block 404 issues initial request credits to the data fabric, which are redeemed for incoming read or write commands. Write commands also require the use of data credits to manage the data buffers 246 (FIG. 2). Data credits are managed separately than the initial credits and additional credits discussed herein. The number of initial request credits is determined by the size of command queues 220. Preferably, enough initial request credits are release to fill half of the entries in each command queue 220, ensuring that if all credits happen to be redeemed to place commands in single queue, it does not overflow. If the two command queues are equal in size, the number of credits released is typically the size of one command queue. If the two command queues are not equal in size, the size of the smaller command queue is used to determine the number of initial credits, ensuring that the credit process is initialized with an amount of credits that are not greater than the smallest command queue. At this point, the data fabric possesses request credits which may be employed by one or more memory access agents connected to the data fabric to send requests to memory controller 210.

At block 406, the process begins receiving read and write memory access requests, each having an associated request credit. For each received access request, at block 408 the credit control circuit redeems an outstanding request credit, for example at outstanding credit tracking logic 302 (FIG. 3). The access request is also processed by address decoder 222 to decode the associated address and select one of the memory channels to receive the memory access requests based on the address. At block 410, the request is allocated to the memory channel by loading it into the command queue for the selected memory channel under control of address decoder 222. Credit control circuit 300 monitors the access requests that are loaded into each command queue at block 410.

At block 412, the process determines if one or more additional request credits have already been issued and are pending for release at the credit control circuit FIFO queue 316 (FIG. 3). The release of additional request credits is further described with respect to FIG. 5. If an additional request credit is pending for release, the process goes to block 420 where no request credits are released for the current incoming request. If not, the process continues to block 414, where it determines if both command queues are at their maximum occupancy. If so, the process goes to block 420. If not, the process goes to block 416, where the process determines if the outstanding request credits are at a maximum value. The maximum value is configurable and is typically set to the sum of the maximum occupancy of both command queues. If the outstanding request credits are at a maximum value at block 416, the process goes to block 420. If not, the process goes to block 418.

At block 418, the process determines if the request allocated to the command queue with a highest number of available entries. If so, the process goes to block 422 where it causes a request credit to be issued to the data fabric. Credit issue logic 310 (FIG. 3), or other suitable digital logic or control circuitry, performs the request credit issuance and updates the outstanding credits. Request credit issuances at block 422 are done without a corresponding de-allocation of a command from one of the command queues, which is beneficial in the depicted process because it allows more efficient use of the two command queues. If the access request is not allocated to the command queue with the most available entries at block 418, the process goes to block 420 where it issues no request credit responsive to this particular access request being allocated.

Using the depicted process, performance advantages are achieved because each command queue is utilized to a higher capacity by allowing "extra" or additional request credits to be issued when commands are allocated to the less-occupied command queue. Further performance advantages are achieved when the depicted process is employed in combination with a dual-arbiter memory controller architecture such as that depicted in FIG. 2, allowing each memory channel to be arbitrated separately while generally operating with a larger number of commands available in the command queue for the arbiter to select than if a more pessimistic approach is used without the queue capacity checking shown in FIG. 4 and FIG. 5.

While flow chart 400 depicts blocks 410, 412, 414, 416, and 418 occurring in order, in actual implementation these decisions are made by digital logic and, in various embodiments, are made in any suitable order or in parallel with logic circuits checking for the some or all of the depicted conditions simultaneously.

Figure 5:
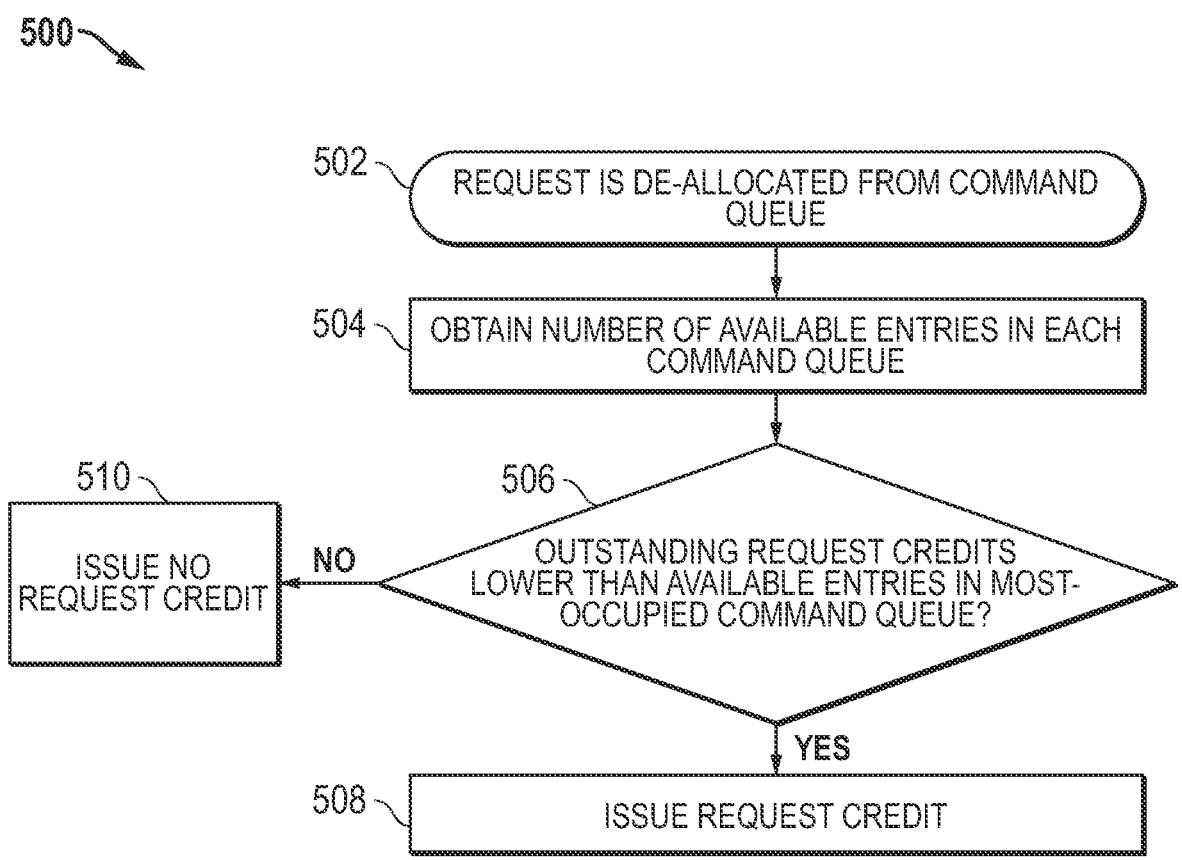
FIG. 5 is a flow diagram of another process for managing request credits at a dual-channel memory controller.

FIG. 5 is a flow diagram 500 of another process for managing request credits at a dual-channel memory controller. In this embodiment, the process is performed by credit control circuit 300 along with the process of FIG. 4 to provide two different ways request credits are issued for a dual-channel memory controller, or a memory controller for two or more memory channels or sub-channels.

At block 502, the process begins responsive to a memory access request being de-allocated from either one of the two command queues. At block 504, the process obtains a number of available entries at each command queue. This information is preferably maintained at the credit control circuit, for example in queue 0 occupancy logic 304 and queue 1 occupancy logic 306 (FIG. 3). In some embodiments, the process may access the command queue directly at block 504 to obtain or calculate the number of available entries in each command queue. The relevant numbers are those after taking into account the de-allocated request at block 502.

At block 506, the process checks if a number of outstanding request credits is lower than a smallest number of available entries of the two command queues and, if so, issues a additional request credit at block 508. This request credit is preferably loaded to FIFO queue 316 (FIG. 3), and released to the data fabric as soon as possible. Outstanding credit tracking logic 302 preferably counts the additional request credit as outstanding when it leaves FIFO queue 316 and is confirmed received by the recipient memory agent on the data fabric. If number of outstanding request credits is not lower than a smallest number of available entries of the two command queues at block 506, the process goes to block 510 where it issues no request credit responsive to the memory access request being de-allocated at block 502.

This credit issue process has the advantage of allowing more efficient use of two command queues, while ensuring that the number of outstanding credits will not become higher than the available entries of the most occupied queue. The data fabric and the requesting memory agent(s) attached thereto preferably have no information as to whether a particular request credit is an initial credit or an additional credit, making the credit tracking process transparent to the data fabric. The data fabric is able to treat the dual-channel memory controller as if it were a single controller with a higher throughput capacity than that of a single channel. The capacity of the two command queues and the two memory channels is combined in a manner transparent to the data fabric, while enabling request credits to be issued more aggressively than they would be if a typical credit management process for a single command queue were employed.

Dual-channel memory controller 210 of FIG. 2 or any portions thereof, such as credit control circuit 221 and address decoder 222, may be described or represented by a computer accessible data structure in the form of a database or other data structure which can be read by a program and used, directly or indirectly, to fabricate integrated circuits. For example, this data structure may be a behavioral-level description or register-transfer level (RTL) description of the hardware functionality in a high level design language (HDL) such as Verilog or VHDL. The description may be read by a synthesis tool which may synthesize the description to produce a netlist including a list of gates from a synthesis library. The netlist includes a set of gates that also represent the functionality of the hardware including integrated circuits. The netlist may then be placed and routed to produce a data set describing geometric shapes to be applied to masks. The masks may then be used in various semiconductor fabrication steps to produce the integrated circuits. Alternatively, the database on the computer accessible storage medium may be the netlist (with or without the synthesis library) or the data set, as desired, or Graphic Data System (GDS) II data.

While particular embodiments have been described, various modifications to these embodiments will be apparent to those skilled in the art. For example, while a dual-channel memory controller is used as an example, the techniques herein may be also be applied to more than two memory channels to combine their capacity in a manner transparent to the data fabric and the host data processing system. For example, three or four memory channels may be controlled using the techniques herein by providing a separate command queue and memory channel control circuitry for each channel, while providing a single interface, address decoder, and credit control circuit issuing request credits to the data fabric which are independent of the individual memory channels. Furthermore, the internal architecture of dual-channel memory controller 210 may vary in different embodiments. Dual-channel memory controller 210 may interface to other types of memory besides DDRx, such as high bandwidth memory (HBM), RAMbus DRAM (RDRAM), and the like. While the illustrated embodiment showed each rank of memory corresponding to separate DIMMs or SIMMs, in other embodiments each module can support multiple ranks. Still other embodiments may include other types of DRAM modules or DRAMs not contained in a particular module, such as DRAMs mounted to the host motherboard. Accordingly, it is intended by the appended claims to cover all modifications of the disclosed embodiments that fall within the scope of the disclosed embodiments.

What is claimed is:

1. A memory controller, comprising:
an address decoder having a first input for receiving memory access requests, a first output, and a second output;
a first command queue having an input coupled to the first output of the address decoder for receiving memory access requests for a first memory channel, and a number of entries for holding memory access requests;
a second command queue having an input coupled to the second output of the address decoder for receiving memory access requests for a second memory channel, and a number of entries for holding memory access requests; and
a request credit control circuit coupled to the first command queue, and the second command queue, the request credit control circuit operable to track a number of outstanding request credits, and to issue a request credit based on a number of available entries of the first and second command queues.

2. The memory controller of claim 1, wherein issuing a credit request based on a number of available entries of the first and second command queues further comprises issuing a credit request if a number of outstanding request credits is lower than a smallest number of available entries of the first and second command queues.

3. The memory controller of claim 1, wherein the request credit control circuit is coupled to a data fabric of a data processing unit and operable to issue request credits to a memory-accessing agent over the data fabric.

4. The memory controller of claim 1, wherein the request credit control circuit is operable to issue a request credit without a corresponding de-allocation from the first or second command queue if a memory access request is received that is allocated to one of the first and second command queues with a highest number of available entries.

5. The memory controller of claim 1, wherein the request credit control circuit is operable to, responsive to a memory access request being de-allocated from one of the first and second command queues that results in the first and second command queues having an equal number of available entries, issue a request credit if the number of outstanding request credits is lower than the equal number of available entries and if not, issuing no request credit responsive to the memory access request being de-allocated.

6. The memory controller of claim 1, wherein the designated event is a memory access request being de-allocated from one of the first and second command queues.

7. The memory controller of claim 1, further comprising:
a first arbiter coupled to the first command queue for selecting entries from the first command queue, and placing them in a first memory interface queue causing them to be transmitted over the first memory channel; and
a second arbiter coupled to the second command queue for selecting entries from the second command queue, and placing them in a second memory interface queue causing them to be transmitted over the second memory channel.

8. The memory controller of claim 1, wherein the address decoder is operable to direct each memory access request to the first command queue or the second command queue based on a target address of the memory access request.

9. The memory controller of claim 1, wherein the first command queue has a different size than the second command queue.

10. The memory controller of claim 1, further comprising at least one additional command queue and at least one additional arbiter coupled to the additional command queue, wherein the request credit control circuit operable to issue a request credit in response to a memory access request being de-allocated from any of the command queues if a number of outstanding request credits is lower than a smallest number of available entries among all the command queues, and if not, issuing no request credit responsive to the memory access request being de-allocated.

11. A method, comprising:
  receiving a plurality of memory access requests at a memory controller;
  decoding addresses of the memory access requests and selecting one of a first memory channel and a second memory channel to receive each of the memory access requests;
  after decoding the addresses, sending each memory access request to one of a first command queue associated with the first memory channel and a second command queue associated with the second memory channel; and
  responsive to a designated event, issuing a request credit based on the number of available entries of the first and second command queues.

12. The method of claim 11, wherein issuing a credit request based on a number of available entries of the first and second command queues further comprises issuing a credit request if a number of outstanding request credits is lower than a smallest number of available entries of the first and second command queues.

13. The method of claim 12, further comprising causing a request credit to be issued without a corresponding de-allocation from the first or second command queue if a memory access request is received that is allocated to one of the first and second command queues with a highest number of available entries.

14. The method of claim 12, further comprising, responsive to a memory access request being de-allocated from one of the first and second command queues that results in the first and second command queues having an equal number of available entries, causing a memory access credit to be issued if the number of outstanding request credits is lower than the equal number of available entries and if not, issuing no request credit responsive to the memory access request being de-allocated.

15. The method of claim 11, wherein the designated event is a memory access request being de-allocated from one of the first and second command queues.

16. The method of claim 11, further comprising:
  with a first arbiter, selecting entries from the first command queue, and placing them in a first memory interface queue causing them to be transmitted over the first memory channel; and
  with a second arbiter, selecting entries from the second command queue, and placing them in a second memory interface queue causing them to be transmitted over the second memory channel.

17. The method of claim 11, further comprising directing each memory access request to the first command queue or the second command queue based on a target address of the memory access request.

18. A data processing system, comprising:
  a data fabric;
  a first memory channel and a second memory channel; and
  a memory controller coupled to the data fabric and the first and second memory channels for fulfilling memory access requests received over the data fabric from at least one memory accessing engine, the memory controller comprising:
    an address decoder having a first input for receiving memory access requests, a first output, and a second output;
    a first command queue having an input coupled to the first output of the address decoder for receiving memory access requests for a first memory channel, and a number of entries for holding memory access requests;
    a second command queue having an input coupled to the second output of the address decoder for receiving memory access requests for a second memory channel, and a number of entries for holding memory access requests; and
    a request credit control circuit coupled to the first command queue, and the second command queue, the request credit control circuit operable to track a number of outstanding request credits, and to issue a request credit based on a number of available entries of the first and second command queues.

19. The data processing system of claim 18, wherein issuing a credit request based on a number of available entries of the first and second command queues further comprises issuing a credit request if a number of outstanding request credits is lower than a smallest number of available entries of the first and second command queues.

20. The data processing system of claim 18, wherein issuing a credit request based on a number of available entries of the first and second command queues further comprises issuing a credit request if a number of outstanding request credits is lower than a smallest number of available entries of the first and second command queues.

21. The data processing system of claim 18, wherein the request credit control circuit is coupled to the data fabric and operable to issue request credits to a memory-accessing agent over the data fabric.

22. The data processing system of claim 18, wherein the request credit control circuit is operable to issue a request credit without a corresponding de-allocation from the first or second command queue if a memory access request is received that is allocated to one of the first and second command queues with a highest number of available entries.

23. The data processing system of claim 18, wherein the request credit control circuit is operable to, responsive to memory access request being de-allocated from one of the first and second command queues that results in the first and second command queues having an equal number of available entries, issue a request credit if the number of outstanding request credits is lower than the equal number of available entries.

24. The data processing system of claim 18, further comprising queue occupancy circuitry operable to calculate a current number of available command entries in each command queue for the request credit control circuit.

25. The data processing system of claim 18, further comprising:
- a first arbiter coupled to the first command queue for selecting entries from the first command queue, and placing them in a first memory interface queue causing them to be transmitted over the first memory channel; and
- a second arbiter coupled to the second command queue for selecting entries from the second command queue, and placing them in a second memory interface queue causing them to be transmitted over the second memory channel.

26. The data processing system of claim 18, wherein the address decoder is operable to direct each memory access request to the first command queue or the second command queue based on a target address of the memory access request.

27. The data processing system of claim 18, wherein the memory accessing engine is a coherent memory slave controller coupled to the data fabric for fulfilling memory access requests from at least one data processing unit.

28. The data processing system of claim 18, wherein the memory accessing engine is a coherent memory master controller coupled to the data fabric for fulfilling memory access requests from at least one data processing unit.

* * * * *